(12) United States Patent
Hansen et al.

(10) Patent No.: US 6,438,780 B1
(45) Date of Patent: Aug. 27, 2002

(54) ASSEMBLY FOR PROCESSING BLANKS

(75) Inventors: Hans Hansen, Middelfart; Christian Ibsen, Hoejer, both of (DK)

(73) Assignee: ECCO SKO A/S, Bredebro (DK)

( * ) Notice: Subject to any disclaimer, the term of this patent is extended or adjusted under 35 U.S.C. 154(b) by 0 days.

(21) Appl. No.: 09/720,217

(22) PCT Filed: Jun. 29, 1999

(86) PCT No.: PCT/DK99/00367

§ 371 (c)(1),
(2), (4) Date: Dec. 22, 2000

(87) PCT Pub. No.: WO00/00376

PCT Pub. Date: Jan. 6, 2000

(30) Foreign Application Priority Data

Jun. 29, 1998 (DK) .......................... 1998 00837

(51) Int. Cl.[7] .......................... A43D 11/00; B65G 41/00; B65G 1/00
(52) U.S. Cl. .......................... 12/1 A; 198/301; 198/304; 198/347.1
(58) Field of Search .................. 12/1 W, 1 A; 29/33 P; 198/465, 301, 303, 304, 347.1

(56) References Cited

U.S. PATENT DOCUMENTS

| | | | |
|---|---|---|---|
| 3,120,666 A | * | 2/1964 | Murphy |
| 3,474,877 A | * | 10/1969 | Wesener |
| 3,968,559 A | | 7/1976 | Karlsson ........................ 29/430 |
| 4,472,783 A | * | 9/1984 | Johnstone et al. |
| 4,608,724 A | * | 9/1986 | Stengelin ...................... 12/17 R |
| 4,639,963 A | * | 2/1987 | Fisher .......................... 12/1 A |
| 4,766,547 A | * | 8/1988 | Modery et al. |
| 5,036,935 A | | 8/1991 | Kohara ........................ 180/168 |
| 5,205,779 A | * | 4/1993 | O'Brien et al. |

FOREIGN PATENT DOCUMENTS

| | | | |
|---|---|---|---|
| DE | 3821098 | 12/1989 | ............ G05D/1/02 |
| EP | 0123173 | * 10/1984 | |
| EP | 0229669 | 7/1987 | ............ G05D/1/03 |

* cited by examiner

Primary Examiner—M. D. Patterson
(74) Attorney, Agent, or Firm—Cooper & Dunham LLP; Donald S. Dowden

(57) ABSTRACT

An assembly for processing blanks comprises a first endless conveyor (1) with locations for holders for the blanks and at least one stationary processing station as well as optionally a second conveyor (6) arranged next to said first conveyor (1). The first conveyor (1) comprises a number of self-propelled vehicles (2), where each vehicle carries a tool (4) and a holding device (3) for the blank device. The first conveyor (1) comprises at least one guiding line (19) marked on the running surface (18). Each vehicle (2) comprises sensors (20) detecting the guiding line, and guiding means (22) guiding the vehicle into the guiding line (19) of the running surface. The running surface (18) comprises a main path (1a) and at least one siding path (11, 10), where the siding paths can be used either for a temporary removal/replacement of a tool (4) on each vehicle (2) as well as for an overtaking or for allowing a temporary putting aside of each vehicle (2) relative to the main path (1a) without involving a change of the succession of the vehicles (2) in the main path (1a). The processing station (7) is positioned radially outside both the siding path (11, 10) and the main path (1a). As a result an assembly is obtained which is far more simple than previously and far less vulnerable in case one or more vehicles must be stopped.

12 Claims, 4 Drawing Sheets

ASSEMBLY FOR PROCESSING BLANKS

TECHNICAL FIELD

The invention relates to an assembly for processing blanks.

BACKGROUND ART

An assembly of this type is known for the manufacture of soles on shoe legs or uppers. The assembly comprises an endless conveyor in form of a number of vehicles provided with shoe legs placed on lasts and which are to be provided with soles. The vehicles follow a solid metal rail projecting upwards from the floor on which said vehicles are driving. Such a structure leaves a good deal to be desired because the rail complicates the assembly, and furthermore said assembly must be stopped in case the tool on said vehicles must be replaced or in case said vehicles require repairs with the result that capacity is lost.

U.S. Pat. No. 3,968,559 discloses an arrangement for assembly of component parts, comprising a conveyor with self propelled vehicles equipped with tools, stationary processing stations radially located outside paths, and main assembly line and a plurality of branch assembly lines where vehicles can be diverted without involving change of succession. A guiding wire is provided along which vehicles move, said wire preferably being embedded in a rubber mat. There is no indication of a guiding line marked on the running surface to be detected by sensors in the vehicles.

BRIEF DESCRIPTION OF THE INVENTION

The object of the invention is to provide an assembly of the above type, which is of a less complicated structure compared to previously and which is less vulnerable in case one or more vehicles must be stopped.

It is also an object of the invention to provide an assembly for processing blanks of the type disclosed in U.S. Pat. No. 3,968,559 with a siding path that provides very reliable guiding of vehicles to follow main or siding paths.

The assembly according to the invention is considerably simplified because solid rails or wires are no longer necessary on or in the floor. In addition, the assembly can run even in case tool must be replaced on one or more vehicles, (such as in connection with a change of the shoe size or the shoe design if the blank is a shoe), or in case a vehicle is to be repaired. The removal/replacement of tool or the repair of a vehicle is carried out by the vehicle in question being guided into one of said siding paths, where a repairman can deal with the tool or the vehicle in question without disturbances. A very reliable guiding of vehicles to follow main or siding paths is provided. Ordinarily if for instance the blanks are shoe legs, two successive vehicles carry a right shoe leg and a left shoe leg, respectively. When the moulding of the sole on for instance the left shoe leg turns out to be defective, care is then taken that said shoe leg is removed and replaced by a new left shoe leg. The vehicles with the right and the left shoe legs, respectively, follow each other in rapid succession, and when a sole is to be moulded onto the latter left shoe leg, the vehicle with the right shoe leg is put aside on one of the siding paths while said vehicle moves forwards in such a manner that said shoe leg clears the processing station. As a result, a sole is only moulded onto the new left shoe leg which is provided on its own vehicle. In this manner it is possible to keep the two shoes of a pair of shoes together on the conveyor. The conveyor is running continuously.

According to the invention a very reliable operation of the assembly is obtained, particularly when a pre-treatment or post-treatment of the blanks is wanted.

Moreover, the invention is particularly simple and reliable in terms of moving of the vehicles. It is also very reliable in manufacturing footwear.

In this manner a very reliable guiding of each vehicle is obtained because the sensors are presented to very distinct lines to be followed.

In addition, the guiding line may according to the invention be formed by a row of coloured spots painted on the floor, said spots being arranged at regular intervals of a distance not exceeding a distance which is slightly smaller than the length of a vehicle. In this manner the guiding line is not very visible with the result that the assembly is provided with a pleasant appearance.

Moreover, each vehicle may according to the invention be formed by an electric trolley, which is supplied with power through a connecting means comprising a rigid member, such as an antenna or a bar, and a resilient member, such as a wire reinforced by a chain, said resilient member being connected to a current collector, where said trolley is supplied with power from a conductor rail system arranged at a considerable distance above the running surface, preferably the guiding line, said conductor rail system for instance including the running rail and the conductor rail, where said current collector for instance comprises a trolley shoe with wheels, which can slide or run on said conductor rail system, preferably by sliding or running on the running rail at the same time as some arms arranged on the current collector can pick up two or more electric phases from the conductor rail. As a result, the vehicles of the assembly are constantly supplied with a reliable and sufficient supply of power with the effect that the assembly can always operate in a flexible manner.

According to the invention the conductor rail system associated with the second siding path and the portion of the main path positioned opposite said second siding path may be formed by a conductor rail common to said lengths of path and associated with a running rail, said rails being arranged above said lengths of path and at a substantially equally long distance therefrom. In this manner it is ensured that a vehicle can be put aside relative to another vehicle on the main path in a very reliable manner, viz. said vehicle can be placed in the siding path while both vehicles are moving forwards. In other words, the two vehicles do not overtake one another.

The conductor rail system may according to the invention comprise both a conductor rail associated with a running rail arranged above the first siding path, and a conductor rail associated with a running rail arranged above the portion of the main path positioned opposite the first siding path, whereby automatic switch means are provided at the locations in the conductor rail system, where the first siding path deviates from or coincides with the main path, said automatic switch means optionally being readjusted by means of a remote control. When a vehicle is in the first siding path it is thus ensured that the trolley shoe of this vehicle has its own conductor rail and running rail with the result that the vehicles previously positioned behind said vehicle can overtake it via the main path.

The rigid portion of the connecting means may according to the invention be mounted in the middle of the front end of each vehicle and project therefrom with the result that the operational wear and tear on the trolley shoe of said vehicle has been minimized.

Moreover, each vehicle may according to the invention comprise navigation means, preferably of the "yes/no"-type, which in response to the position of the vehicle are adapted such that when said vehicle reaches the injection moulding station said navigation means accept said vehicle at the injection moulding station or reject said vehicle with the result that said vehicle merely moves on. As a result a considerable simplification has been obtained because the known systems requiring a "docking" of the tool into a corresponding tool on the injection moulding machine have been avoided.

According to the invention the main path may be oblong, such as substantially oval, and preferably comprise two parallel long sides and two semi-circular end members connecting said long sides. In practice, this embodiment turned out to be particularly advantageous.

Each guiding line may according to the invention be formed by two thin, substantially parallel guiding stripes preferably painted on the floor, where each stripe may be of a width in the range of 1 to 9 cm, and where the distance between said stripes is in the range of 0.5 to 5.0 cm. The resulting operation is particularly reliable because the sensors must maintain the vehicle inside two clearly marked borderlines, viz. the two stripes.

Finally according to the invention a transfer location may be marked on the running surface by means of lines or codes, whereby the sensors of each vehicle can be adapted to stop said vehicle at this location for a manual or automatic replacement of the last present on said vehicle, where the automatic replacement for instance is carried out by means of a robot, and where a shoe leg with a sole moulded thereon is placed on said last which is to be replaced by a last with a shoe leg without a sole placed thereon. As a result a particularly reliable transfer of the shoe legs placed on lasts from the second conveyor to the first conveyor and vice versa is obtained.

BRIEF DESCRIPTION OF THE DRAWINGS

The invention is explained in detail below by means of embodiments of the assembly with reference to the accompanying drawings, in which.

BEST MODE FOR CARRYING OUT THE INVENTION

Figure 1:
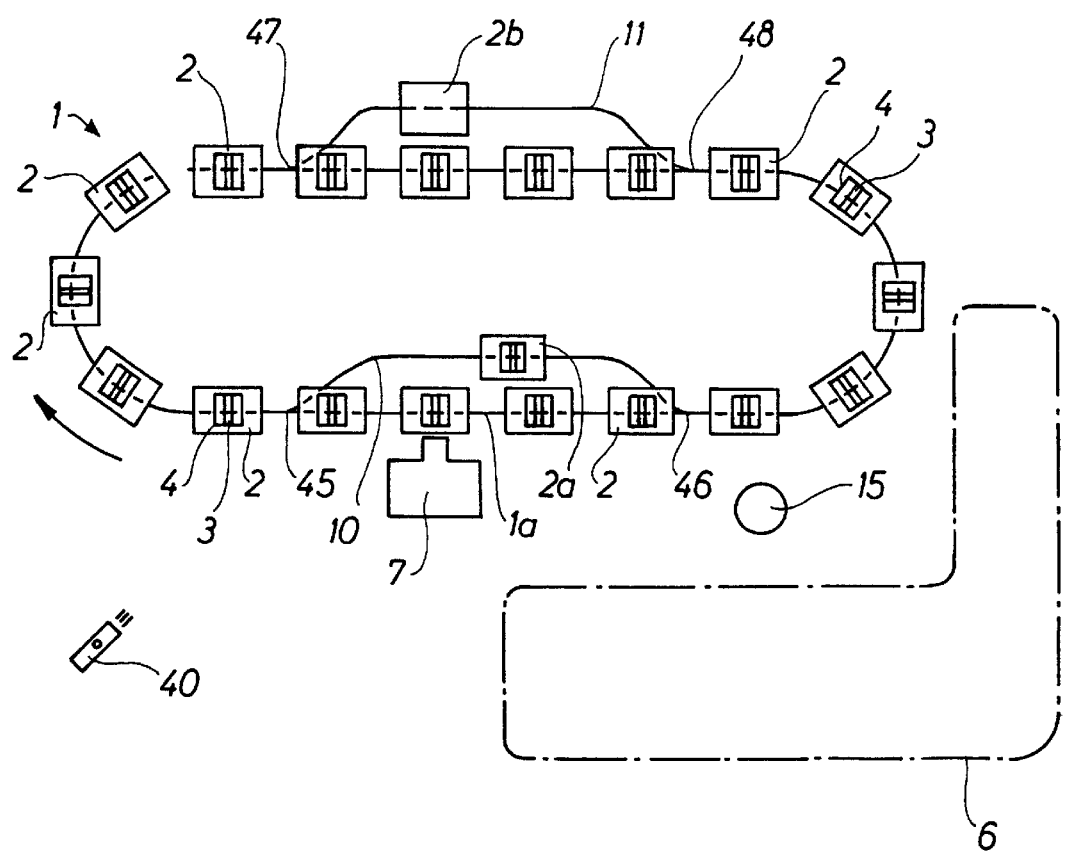
FIG. 1 is a diagrammatic top view of an embodiment of an assembly according to the invention.

The assembly shown in FIG. 1 is to be used for processing blanks, such as moulding of soles onto shoe legs as described and shown below.

The assembly comprises a first endless conveyor 1 with a number of self-propelled vehicles 2. Each vehicle is at the top provided with a tool 4, such as a mould, and a holding device 3 for the holder of the blank to be processed. When the blank is a shoe leg, the holding device is a last. When the assembly is running, a shoe leg is placed on a last.

The assembly comprises furthermore at least one stationary processing station 7, on which the above blanks can be processed. When a sole is to be moulded onto a shoe leg, the processing station 7 can be an injection moulding station. This injection moulding station is positioned radially opposite the conveyor 1. A second endless conveyor 6 can optionally be arranged next to the first conveyor 1, and the blanks to be processed on the first conveyor 1 can be subjected to a pretreatment on the second conveyor 6. However, the blanks to be processed on the first conveyor 10 can also be transferred to the second conveyor 6 for a posttreatment. It is obvious that such a procedure implies that either a manual or an automatic transfer of the blanks from the second conveyor 6 to the first conveyor 1 or vice versa can be carried at the transfer location 15. When the blanks are shoe legs to be provided with a sole, said blanks can be subjected to a moulding and a pretreatment on the conveyor 6. It is also possible on this second conveyor 6 to posttreat and/or remove the shoe legs from the lasts, said shoe legs being placed with a sole moulded thereon on the first conveyor 1. The second conveyor can be of many different shapes, but the shape is not essential to the present invention.

Figure 2:
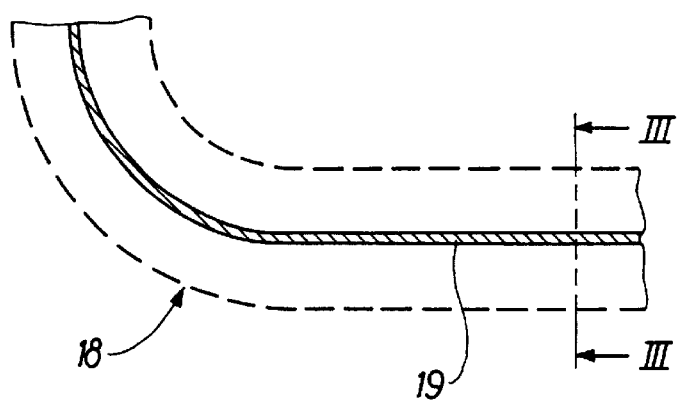
FIG. 2 is a top view of a portion of the running surface of the assembly according to the invention.
Figure 3:
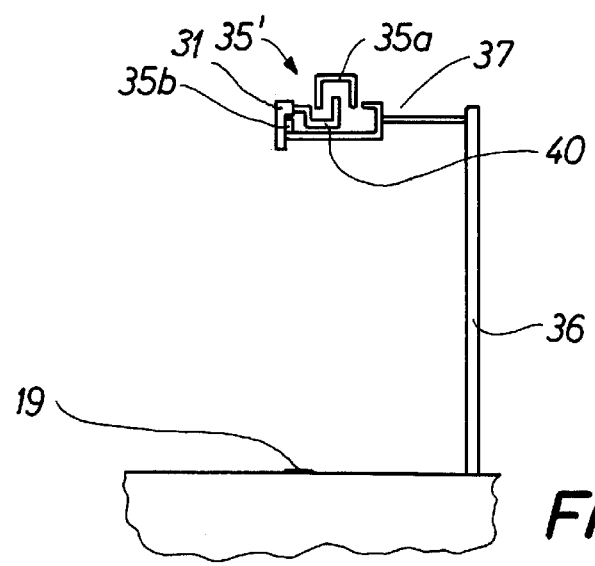
FIG. 3 is a vertical sectional view through the assembly taken along the line III—III of FIG. 2.

The vehicles 2 are self-propelled and preferably electrically driven. In addition, they are in principle independent of one another. They run on a running surface 18, cf. FIG. 2, which for instance forms part of the floor on which the assembly is arranged. The running surface is marked by means of a guiding line of no particular mass because it can be formed by a painted line on said running surface. FIG. 3 is a vertical sectional view through the running surface. It appears clearly that the guiding line is of no particular mass with the result that no actual guiding body keeping each vehicle on the right course is provided.

Figure 4:
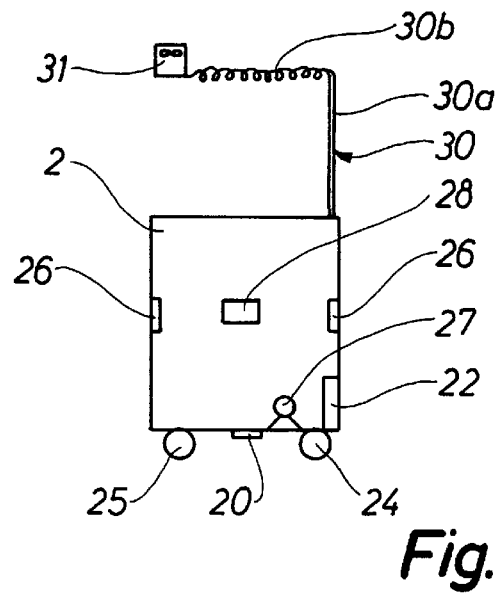
FIG. 4 is a diagrammatic side view of a vehicle shaped as a trolley.

As illustrated in FIG. 4, each vehicle 2 comprises a sensor 20 for detecting the guiding line 19, as well as guiding means 22 adapted to guide the vehicle 2 towards or adjacent the guiding line 19 of the running surface. The guiding means act on both an electromotor 27 on the vehicle and on a turning mechanism capable of turning the front wheels 24 of the vehicle 2. Besides, the vehicle is also provided with two rear wheels 25 arranged rather close to one another.

It appears from FIG. 1 that the running surface comprises a main path 1 associated with at least one siding path. In the present case, a first siding path 11 and a second siding path 10 are provided, where the first siding path 11 is used for a removal/replacement of the tool on each vehicle 2. The vehicles on the main path can overtake the vehicles running in the siding path 11. The second siding path 10 implies that any vehicle, if desired, can run (be put) aside relative to the neighbouring vehicle in front thereof and the neighbouring vehicle therebehind on the main path in such a manner that the vehicle in question is kept clear of the injection moulding machine 7 during any passage. The siding path 10 cannot be used for changing the succession of vehicles on the main path length 1a due to the structure of the conductor rail system described in greater detail below. The removal/replacement of tools (moulds) applies when it is desired to readjust the assembly so as to run with other shoe sizes or other types of shoes. The vehicles running on the main path 1a can be advanced steadily to the injection moulding machine 7 although one or more vehicles 2a in the succession of vehicles has/have been put aside by being guided into the siding path 10. It should be noted that the vehicles put aside move forwards together with the remaining vehicles. The distance between the guiding line of the main path 1a and the guiding line of a siding path can be substantially larger than the width b of a vehicle 2.

The assembly runs typically with 18 vehicles at a time, i.e. with 18 lasts corresponding to 9 pairs of shoes.

As illustrated in FIG. 1, the guiding line of the second siding path 10 over the majority of its length extends substantially parallel to the portion of the main path positioned opposite said siding path. The guiding line of the siding path can at a branching location 45 be without a direct connection with the guiding line of the main path 1a, but extend relatively close thereto. At the branching location 46 the guiding line 11 is even positioned at a considerable distance from the guiding line 1a.

Figure 8:
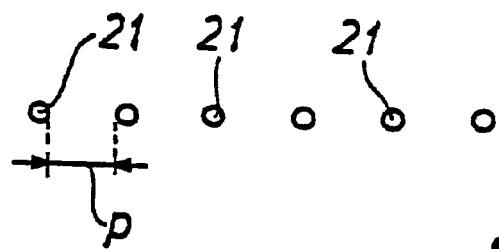
FIG. 8 illustrates a guiding line comprising spots.

With reference to FIGS. 1 and 8, a guiding line, such as 1a, can be formed by a row of optionally coloured spots 21 interspaced a distance p and painted, on the floor, said distance p being slightly shorter than the length of a vehicle 2, cf. FIG. 1.

As shown in FIG. 1 the first siding path 11 for the removal/replacement of tools and for the change of the succession of vehicles on the path can be positioned outside the area defined by the main path 1a, whereas the second siding path 10 can be positioned inside said area defined by the main path 1a, said second siding path 10 being used for putting aside the vehicles and keeping them there relative to the remaining vehicles on the main path. In this manner the required space has been reduced.

As mentioned each vehicle 2 can be shaped as an electric trolley, cf. also FIG. 4. This trolley is connected to a current collector 31 through a connecting means 30 comprising a rigid member 30a, such as an antenna or a bar, and a resilient member 30b, such as a wire reinforced by a chain. The current collector 31 supplies the vehicle 2 with current from a conductor rail system 35 arranged above the running surface, preferably above the guiding line and being supported by some vertical poles 36 with transverse bars 37.

Only one pole 36 and one transverse bar 37 appear from FIG. 3.

Figure 7:
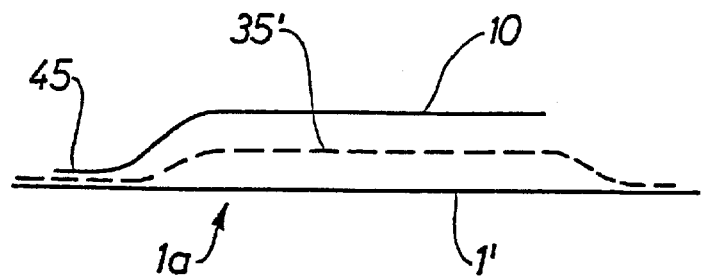
FIG. 7 is a diagrammatic view of an embodiment of the second siding path.

In FIG. 7 a portion of the conductor rail system has been indicated by means of a dotted line. It is obvious that this portion of the system is common to and associated with the second siding path 10 and the main path length 1'. The system portion 35' is equally spaced from the siding path 10 and the main path length 1', respectively. Like the remaining conductor rail system, this system portion 35' comprises a conductor rail 35a usually associated with several electric phases and a running rail 35b arranged next to said conductor rail. The current collector 31 can roll or slide on the latter running rail. The current collector comprises a few arms 40 projecting into the conductor rail 35a, where each arm scans an electric phase, the electric phases being associated with their respective electric auxiliary rails inside the rail 35a.

Figure 9:
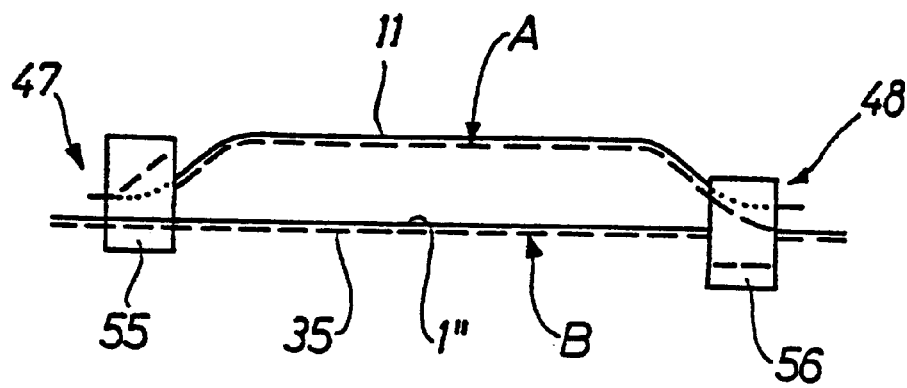
FIG. 9 is a diagrammatic view of an embodiment of the first siding path.

In FIG. 9, the portion of the conductor rail system 35 positioned just above the first siding path 11 is marked A, whereas the portion of said conductor rail system positioned just above the main path length 1" is marked B. In the main path length 1", the vehicles 2 can overtake the vehicle 2b in the siding path 11. Switching points 55 and 56, respectively, are provided at the locations 47 and 48, where the siding path 11 deviates from or coincides with the main path, respectively. These switching points can be set automatically, optionally by means of a remote control (not shown).

Figure 10:
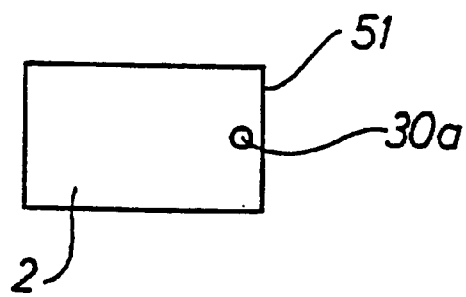
FIG. 10 is a diagrammatic top view of a vehicle.

The above current collector 31 can slide or roll on the running rail 35b, cf. FIG. 4. The resilient member 30b of the connecting means 30 of the vehicle 2 can be made relatively long in such a manner that each vehicle achieves a rather wide freedom of movement without risking that the current collector 31 jumps off the running rail 35b. As illustrated in FIG. 10, the rigid member 30a of the connecting means 30 of the vehicle 2 can be mounted in the middle of the front end 51 of said vehicle in such a manner that it projects from said front end.

It appears also from FIG. 4 that each vehicle 2 can be provided with distance controlling means 26 preferably comprising optically acting distance measuring devices. These controlling means 26 are adapted to ensure maintenance of a constant predetermined distance between each vehicle and the neighbouring vehicles. Therefore the controlling means 26 are connected to the electromotor 27 of the vehicle.

When one of the vehicles 2 is put in one of the siding paths 10 or 11, the remaining vehicles quickly adjust to a new individual optimum distance. In other words, the distance between succeeding vehicles is always optimum in every operational situation.

As shown in FIG. 4, each vehicle can comprise navigation means 28, preferably of the "yes/no"-type. When the vehicle reaches the injection moulding machine 7, these navigation means are adapted to accept said vehicle at the injection moulding machine or to reject said vehicle with the result that said vehicle merely moves on. Thus it is no longer required that the vehicle with the associated tool must "dock" in order to be correctly positioned relative to said injection moulding machine. The correct positioning of the vehicle is solely determined by the navigation means.

The main path 1a can be oblong, such as substantially oval, but according to the most advantageous embodiment it comprises two parallel long sides and two semi-circular end members connecting said long sides, cf. FIG. 1.

Figure 5:
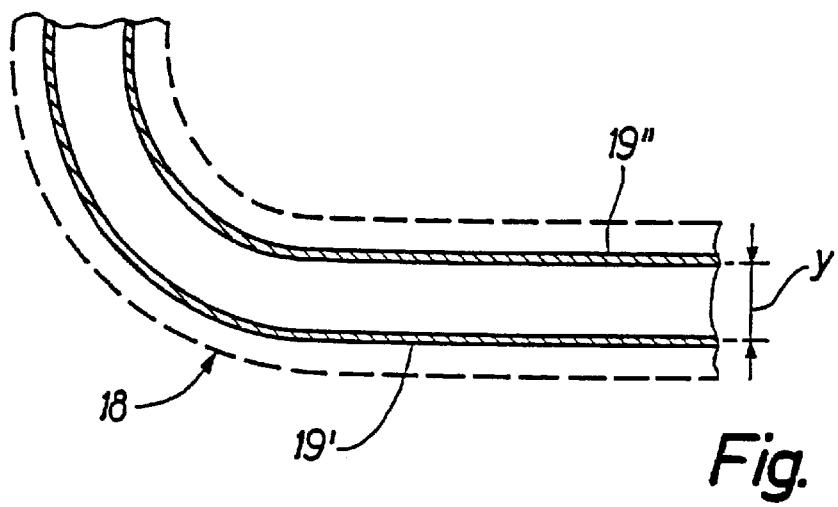
FIG. 5 is a top view of a portion of a second embodiment of the running surface according to the invention.

Nothing prevents each guiding line from comprising two thin, substantially parallel guiding stripes 19' and 19" extending on the floor. These guiding stripes are preferably painted on the floor on which the assembly is mounted, cf. FIG. 5. Each stripe is preferably of a width in the range of 1 to 9 cm, and the distance y between the stripes is in the range of 0.5 to 5.0 cm.

The sensor 20 of each vehicle 2 can be formed by a pattern recognition equipment, such as a camera-vision-system, mounted on or adjacent the bottom side of the vehicle or optionally an equipment employing infrared light.

The transfer location 15, cf. FIG. 1, can be marked on the running surface 18 by means of lines or codes not shown. In this case, the sensor 20 of each vehicle is adapted to stop the vehicle at this location for a manual or automatic replacement of the last present on said vehicle and carrying a shoe leg with a sole moulded thereon, said last being replaced by a last carrying a shoe leg without a sole. The latter replacement is for instance carried out by means of a robot not shown.

As shown in FIG. 1, a remote control 40 can be provided in connection with the assembly, said remote control being handled either manually or by means of a robot. When activated either manually or by means of the robot, this remote control is adapted so as to act on the guiding means 22 and/or the navigation means 28 in such a manner that each vehicle 2 can be guided into a siding path 10 or 11 while all the vehicles are moving. In other words, the operator need not stand right next to the assembly, but can operate said assembly at a large distance therefrom.

Figure 6:
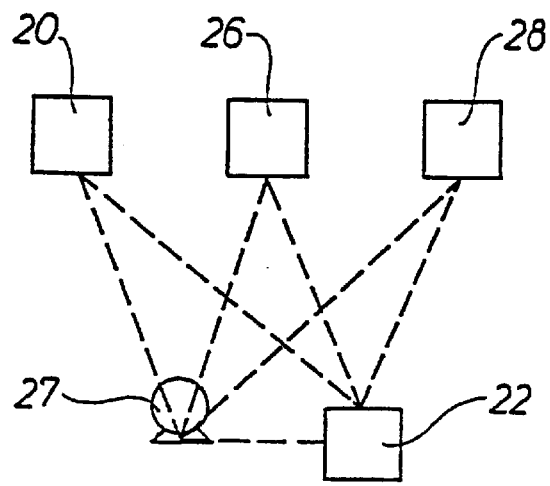
FIG. 6 is a diagrammatic view of how the sensors, the distance controlling means and the navigation means in the vehicle are connected to the electromotor and the guiding means.

FIG. 6 shows how the sensors 20, the distance controlling means 26 and the navigation means 28 of the vehicle are coupled to the electromotor 27 and the guide members 22 of the vehicle.

Concerning the siding path 10 it should be noted in connection with FIG. 7 that when a vehicle 2 is to be suddenly taken aside while moving on the main path length 1', the latter is possible anywhere along the length 1' because the vehicle in question can be adjusted immediately by way of a signal from the remote control so as to move into the siding path 11 and follow said siding path while moving forwards. At the branching location 45, the vehicle put aside slides, however, back into its usual position in the succession of vehicles in the main path.

The invention may be modified in many ways without thereby deviating from the scope of the invention as defined by the appended claims.

What is claimed is:

1. An assembly for processing blanks, and which comprises a first endless conveyor (1) with location for holders (3) for the blanks, and which further comprises at least one stationary processing station (7) for carrying out said processing, said first conveyor comprising a number of self-propelled vehicles (2), where each vehicle is equipped with a tool (4), and a holding device for the blank holder (3), wherein the first conveyor (1) comprises at least one guiding line (19) comprising a row of colored spots marked on a running surface (18), wherein each vehicle (2) is provided with sensors (20) for detecting said guiding line as well as guiding means (22) which are adapted to guide said vehicle towards or adjacent the guiding line (19) of the running surface, the running surface (18) comprises a main path (1a) and at least one siding path (10, 11), which siding path can be used either for a temporary removal/replacement of the tool (4) on each vehicle (2) or for allowing an overtaking or temporary moving aside of each vehicle (2) relative to the main path without involving a change of the succession of vehicles on the main path, the processing station (7) is positioned outside both the siding path and the main path, the guiding line of each siding path (10) over the majority of its length extends substantially parallel to the opposing length (1') of the guiding line of the main path (1a), and the guiding line (10) of said siding path is without a direct connection with the guiding line (1a) of the main path at the branching location (45, 46), but instead extends relatively close and parallel to the guiding line of said main path at said locations (45, 46).

2. An assembly according to claim 1-3, further comprising a second endless conveyor (6) arranged next to said first conveyor (1) for pretreating or posttreating the blanks which are processed on said first conveyor (1).

3. An assembly according to claim 1 where the blanks are shoe legs and the blank holders are lasts and wherein said processing is moulding of soles onto the shoe legs arranged on lasts, the stationary processing station (97) is an injection moulding station, said shoe legs are placed on and subjected to a pretreatment on said second conveyor (6), or subjected to a de-lasting on said second conveyor (6), and each self-propelled vehicle is electrically driven and equipped with a mould tool and a last holding device.

4. An assembly according to claim 1, wherein the spots are arranged at regular intervals of a free distance (p) not exceeding a distance which is slightly smaller than the length (1) of a vehicle.

5. An assembly according to claim 1, wherein each vehicle is formed by an electric trolley, which is supplied with power through a connecting means (30) comprising a rigid member (30a) and a resilient member (30b), said resilient member being connected to a current collector (31), where said trolley is supplied with power from a conductor rail system (35) arranged in spaced apart relation to and above the running surface (18), said conductor rail system (35) including the running rail (35b) and the conductor rail (35a), where said current collector comprises a trolley shoe with wheels, which can slide or run on said conductor rail system at the same time as some arms (40) arranged on the current collector (31) can pick up two or more electric phases from the conductor rail (35a).

6. An assembly according to claim 5, wherein the conductor rail system (35) is associated with a second siding path (10) and the portion (1') of the main path positioned opposite said second siding path is formed by a conductor rail common to said lengths of path and associated with a running rail, said rails being arranged above said lengths of path and at a substantially equally long distance therefrom.

7. An Assembly according to claim 5, wherein the conductor rail system (35) comprises both a conductor rail (35a) associated with a running rail (35b) arranged above the first-named siding path (11) and a conductor rail associated with a running rail arranged above the portion of the main path positioned opposite the first-named siding path, automatic switch means (55, 56) are provided at the locations (47, 48) in the conductor rail system, where the first siding path (11) deviates from or coincides with the main path (1), said automatic switch means optionally being readjusted by means of a remote control (40).

8. An assembly according to claim 5, wherein the rigid member (30a) of the connecting means (30) is mounted in the middle of the front end (51) of each vehicle (2) and projects therefrom.

9. An assembly according to claim 1, wherein each vehicle (2) is provided with distance controlling means (28), of the "yes/no"-type constructed so that when said vehicle reaches the injection moulding station (7) said navigation means accept said vehicle at the injection moulding station (7) or reject said vehicle with the result that said vehicle merely moves on.

10. An assembly according to claim 1, wherein the main path (1a) is oblong and comprises two parallel long sides and two semi-circular end members connecting said long sides.

11. An assembly according to claim 1, wherein each guiding line is formed by two thin, substantially parallel guiding stripes (19',19") painted on the floor, and where each stripe (19',19") is of a width in the rage 1to 9 cm, and where the distance (y) between the stripes is in the range of 0.5 to 5.0 cm.

12. An assembly according to claim 1, wherein a transfer location (15) is marked on the running surface (18) by means of lines or codes, the sensors (20) of each vehicle are adapted to stop the vehicle at this location for a manual or automatic replacement of the last present on said vehicle (2), where the automatic replacement is carried out by means of a robot, and where a shoe leg with a sole moulded thereon is placed on said last which is to be replaced by a last with a shoe leg without a sole moulded thereon.

* * * * *